United States Patent
Shinohara

(10) Patent No.: US 7,576,764 B2
(45) Date of Patent: Aug. 18, 2009

(54) DEVICE AND METHOD FOR CONTROLLING TIMING FOR STARTING IMAGE FORMATION, AND AN IMAGE FORMING APPARATUS USING SUCH DEVICE AND METHOD

(75) Inventor: Tadashi Shinohara, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 112 days.

(21) Appl. No.: 11/555,476

(22) Filed: Nov. 1, 2006

(65) Prior Publication Data

US 2007/0097202 A1    May 3, 2007

(30) Foreign Application Priority Data

Nov. 1, 2005    (JP) .............. 2005-318659

(51) Int. Cl.
  *B41J 2/435*    (2006.01)
  *B41J 2/47*     (2006.01)
(52) U.S. Cl. ....................... 347/235; 347/250
(58) Field of Classification Search ......... 347/234–235, 347/248–250; 358/468
See application file for complete search history.

(56) References Cited

U.S. PATENT DOCUMENTS

| 5,737,665 A | 4/1998 | Sugiyama et al. |
| 5,765,083 A | 6/1998 | Shinohara |
| 6,118,557 A | 9/2000 | Sugiyama et al. |
| 6,128,459 A | 10/2000 | Iwata et al. |
| 6,163,334 A * | 12/2000 | Irie et al. ............... 347/249 |
| 6,211,898 B1 * | 4/2001 | Tabuchi ................ 347/248 |
| 6,282,396 B1 | 8/2001 | Iwata et al. |
| 6,295,435 B1 | 9/2001 | Shinohara et al. |
| 6,377,363 B1 * | 4/2002 | Ito ...................... 358/468 |
| 6,380,960 B1 | 4/2002 | Shinohara |
| 6,381,435 B2 | 4/2002 | Shinohara et al. |
| 6,573,918 B2 | 6/2003 | Shinohara et al. |
| 6,587,137 B2 | 7/2003 | Shinohara et al. |
| 6,693,654 B2 | 2/2004 | Shinohara |
| 6,704,035 B2 | 3/2004 | Kobayashi et al. |
| 6,711,364 B2 | 3/2004 | Shinohara |
| 6,833,856 B2 * | 12/2004 | Maeda ................. 347/248 |
| 6,847,390 B2 | 1/2005 | Maeda |
| 2003/0067533 A1 | 4/2003 | Omori et al. |
| 2003/0137577 A1 | 7/2003 | Shinohara |
| 2004/0041896 A1 | 3/2004 | Shinohara |

(Continued)

FOREIGN PATENT DOCUMENTS

| EP | 1 298 577 A2 | 4/2003 |
| JP | 2002-55292 | 2/2002 |
| JP | 2004-58404 | 2/2004 |
| JP | 2004219887 A * | 8/2004 |

*Primary Examiner*—Hai C Pham
(74) *Attorney, Agent, or Firm*—Oblon, Spivak, McClelland, Maier & Neustadt, P.C.

(57) ABSTRACT

A device and method for controlling timing for starting image formation, and image forming apparatus using such device and method are described. A detector outputs a synchronization detection signal when a light beam enters the detector. The timing for starting image formation is determined based on timing when a counter value, which is counted from timing when the synchronization detection signal is detected, reaches a reference counter value. The reference counter value may be determined according to an operation mode.

17 Claims, 7 Drawing Sheets

U.S. PATENT DOCUMENTS

| | | |
|---|---|---|
| 2005/0009351 A1 | 1/2005 | Takahashi et al. |
| 2005/0088505 A1 | 4/2005 | Shinohara |
| 2005/0200689 A1 | 9/2005 | Shinohara et al. |
| 2005/0238372 A1 | 10/2005 | Shinohara et al. |
| 2006/0164497 A1 | 7/2006 | Shinohara |

* cited by examiner

| | R [dpi] | V [mm/s] | N [rpm] | f [MHz] | M |
|---|---|---|---|---|---|
| HIGH-SPEED MODE | 600 × 600 | V0 | N0 | f0 | M0 |
| HEAVY-PAPER MODE | 600 × 600 | V0/2 | N0/2 | f0/2 | M1 |
| HIGH-QUALITY MODE | 1200 × 1200 | V0/4 | N0/2 | f0 | M2 |

DEVICE AND METHOD FOR CONTROLLING TIMING FOR STARTING IMAGE FORMATION, AND AN IMAGE FORMING APPARATUS USING SUCH DEVICE AND METHOD

CROSS-REFERENCE TO RELATED APPLICATIONS

This patent application is based on and claims priority to Japanese patent application No. 2005-318659 filed on Nov. 1, 2005, in the Japanese Patent Office, the entire contents of which are hereby incorporated by reference.

FIELD OF THE INVENTION

The following disclosure relates generally to a device, apparatus, method, system, computer program and product, each capable of forming an image using a light beam.

DESCRIPTION OF THE RELATED ART

In an image forming apparatus, an optical writing device is provided, which modulates a light beam according to image data, and scans the modulated light beam in the main scanning direction to form an image on an image carrier. In order to improve quality of the image, timing at which the modulated light beam starts irradiating in the main scanning direction, i.e., timing for starting image formation, is usually controlled using a detector that detects the light beam. For example, the detector may be provided outside of an image formation area. The detector detects the light beam before the light beam enters the image forming area, and outputs a synchronization detection signal to a writing controller. Based on the synchronization detection signal, the writing controller instructs the optical writing device to start irradiating the modulated light beam. Accordingly, the detection accuracy of the detector is one of the factors that contribute high image quality. For this reason, various approaches are taken to increase the detection accuracy of the detector. For example, an imaging apparatus described in the Japanese Patent Application Publication No. 2004-58404 measures a time period it takes for a light beam to travel between two sensors, and determines whether a synchronization detection signal is output normally by comparing the measured time period with a reference time period.

However, the imaging apparatus described in the Japanese Patent Application Publication No. 2004-58404 does not explicitly address a case in which timing when the synchronization detection signal is detected by the writing controller is delayed relatively to timing when the light beam is detected by the detector. As shown in FIG. 1, theoretically, the detector outputs a synchronization detection signal DETP1 having a square waveform at timing T1 when the detector detects the light beam, for example, using a light receiving element such as a photodiode. However, in reality, the detector outputs a synchronization detection signal DETP2 having a sine waveform due to the electric characteristics of the detector. Accordingly, the writing controller may detect the synchronization detection signal DETP2 at timing T2 after the timing T1. Thus, the delay time period Δt, which is the difference between the timing T1 and the timing T2, needs to be considered when determining timing for starting image formation.

Further, the position at which the image formation is started in the image forming area, i.e., the image formation start position, may vary depending on various image forming conditions including, for example, the process speed of the image forming apparatus or the resolution of the image. In order to further improve the image quality, the timing for starting image formation may need to be changed depending on various image forming conditions to compensate the fluctuations in the image formation start position.

BRIEF SUMMARY OF THE INVENTION

Example embodiments of the present invention include an apparatus, method, system, computer program and product, each capable of controlling timing for starting image formation.

In one example, an optical writing device is provided, which includes an exposure device and a writing controller. The exposure device irradiates a light beam and scans the light beam in a main scanning direction to form an image in an image forming area. The exposure device includes a first detector provided outside of the image forming area, which outputs a first synchronization detection signal when the light beam enters the first detector. The writing controller outputs an image forming start signal for instructing the exposure device to start image formation in the image forming area. The writing controller includes a counter, which counts a time period in the main scanning direction in synchronization with a reference clock signal to generate a counter value, initializes the counter value when the first synchronization detection signal is detected by the writing controller, and causes the writing controller to output the image forming start signal when the counter value is equal to or greater than a reference counter value.

In another example, a method for controlling timing for starting image formation is provided. An optical writing device, which outputs a synchronization detection signal, is provided. A counter value, which is a time period in a main scanning direction, is counted from timing when the first synchronization detection signal is detected. When the counter value becomes equal to or greater than a reference counter value, an image forming start signal is output, which causes the optical writing device to start image formation.

In addition to the above-described device and method, the present invention may be implemented in various other ways.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
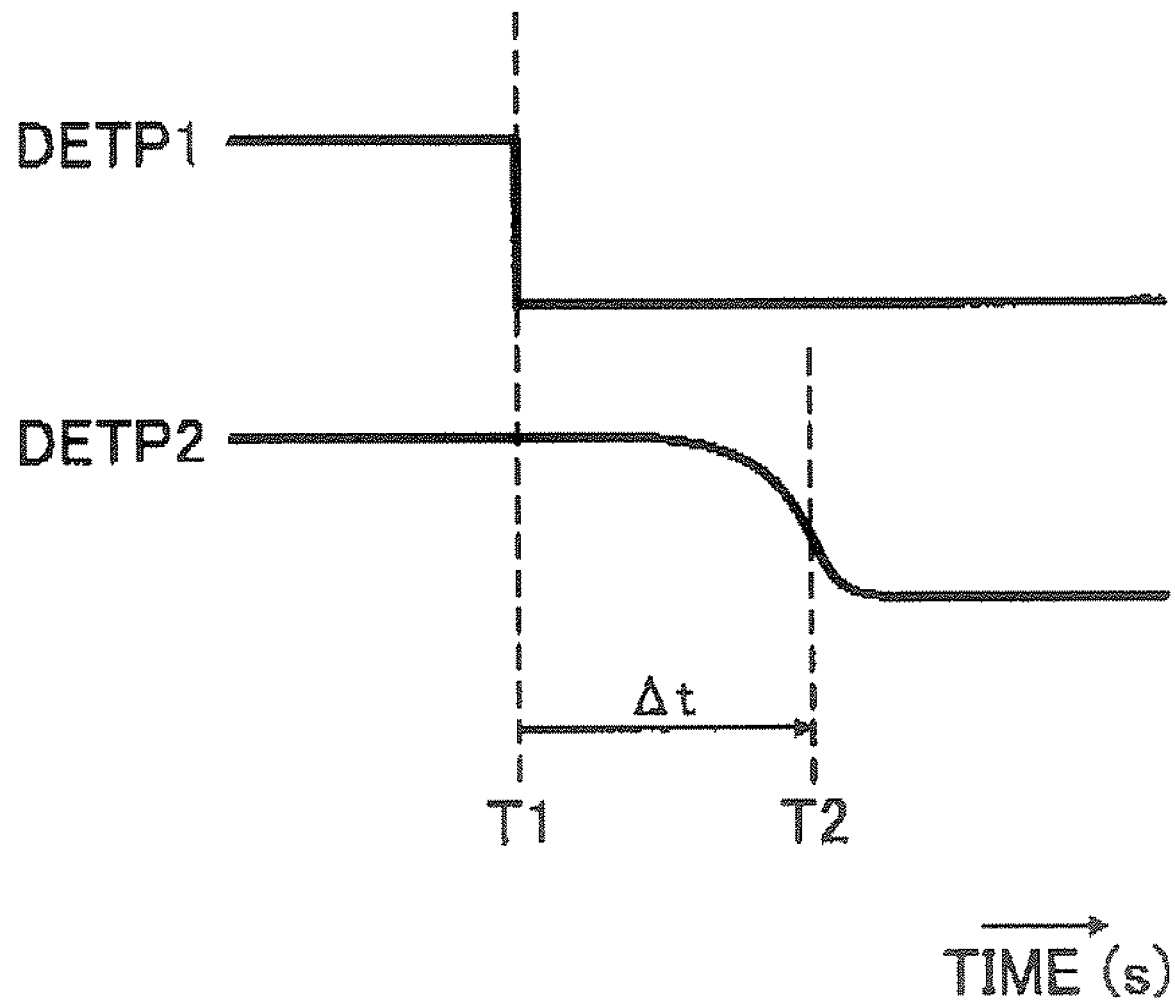
FIG. 1 is a timing chart illustrating timing when a light beam is detected by a detector relative to timing when a synchronization detection is detected by a writing controller.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 2 illustrates an optical writing device 100 and its surroundings when the optical writing device 100 is incorporated in an image forming apparatus, according to an example embodiment of the present invention.

In this example, the image forming apparatus is implemented as a tandem-type color image forming apparatus. The image forming apparatus of FIG. 1 includes the optical writing device 100, four image forming devices 20Y, 20M, 20C, and 20K, a transfer belt 2, a first transfer roller 3, a second transfer roller 4, a sheet tray 5, a fixing device 13, a first mark detector 14, and a second mark detector 15.

Figure 2:
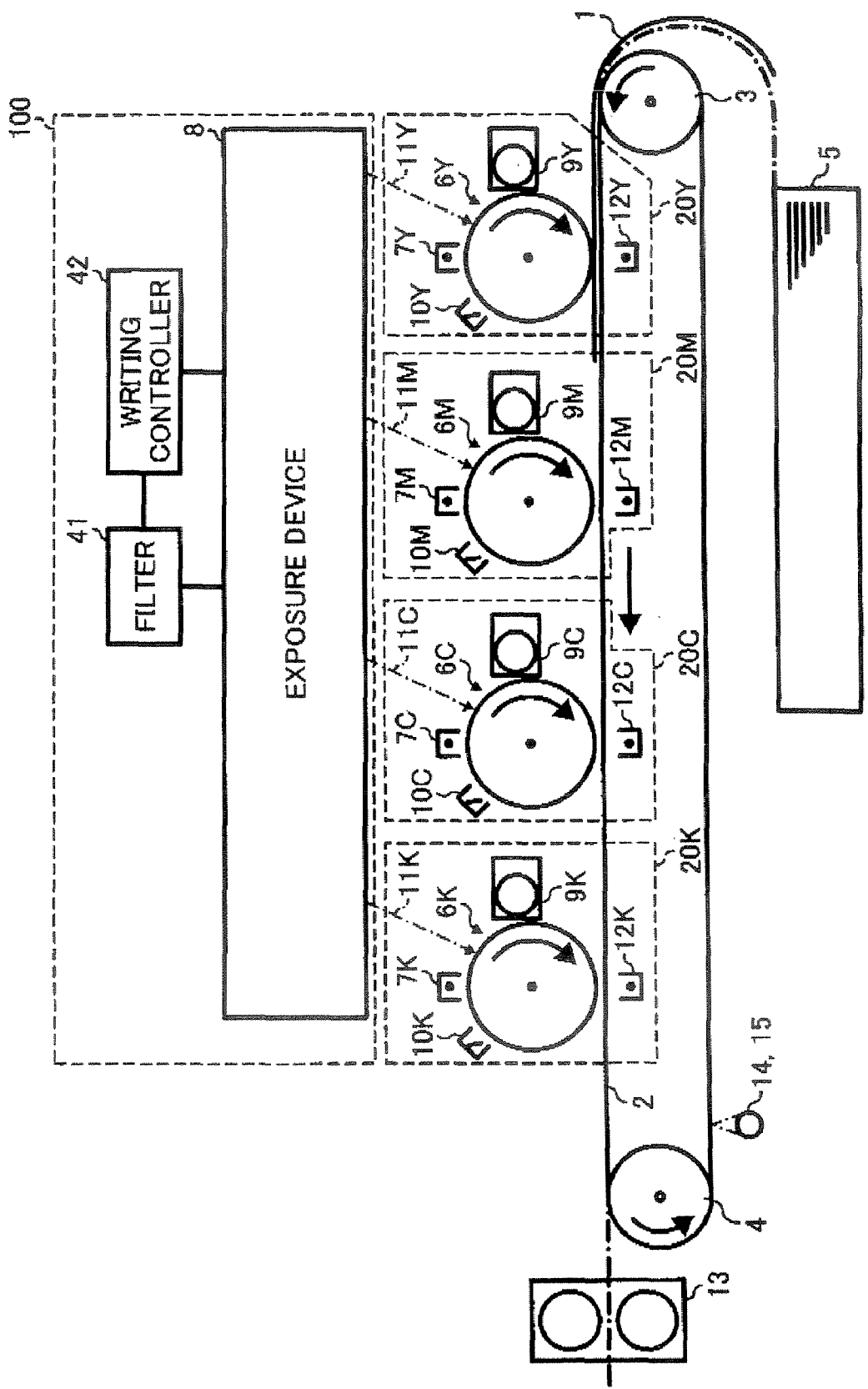
FIG. 2 is a schematic block diagram illustrating an optical writing device and its surroundings when the optical writing device is incorporated in an image forming apparatus according to an example embodiment of the present invention.
Figure 5:
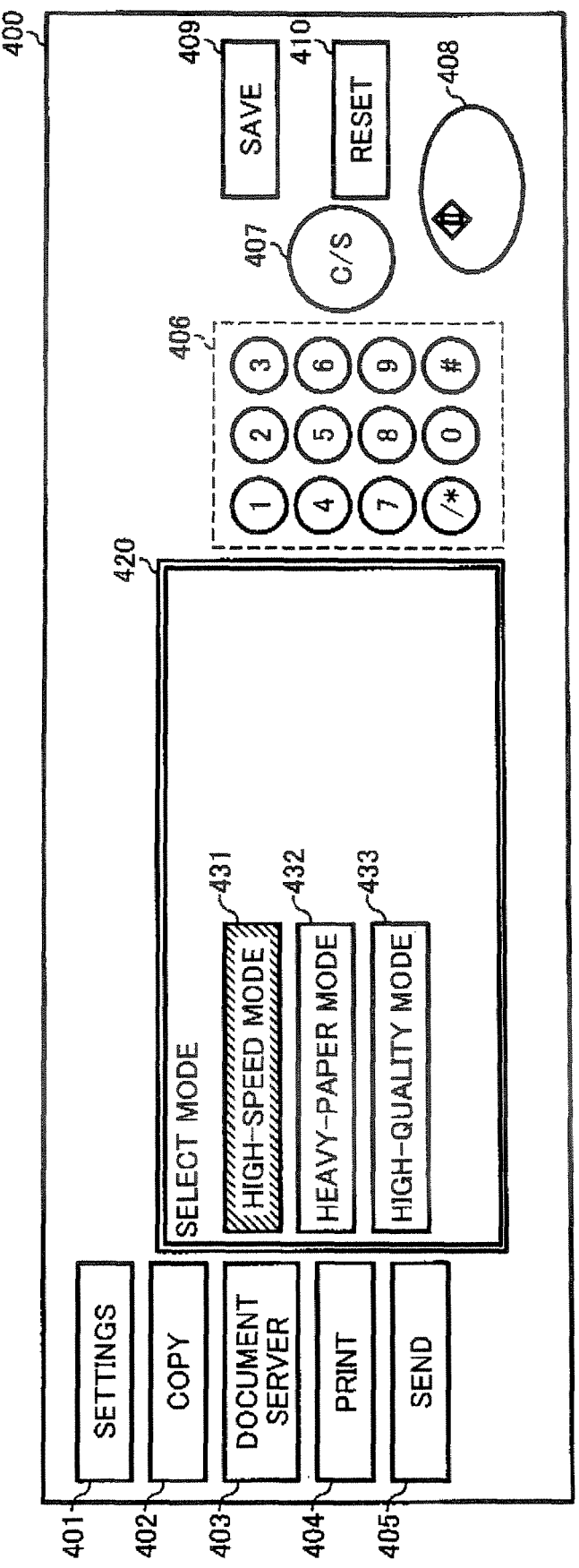
FIG. 5 is a schematic plan view illustrating the structure of an operation panel provided with the image forming apparatus shown in FIG. 2 according to an example embodiment of the present invention.

In addition to the devices shown in FIG. 2, the image forming apparatus of FIG. 2 may include other devices, for example, an operation panel 400 shown in FIG. 5, an image reader such as a scanner, an image processor, a sheet transfer device, etc. Referring to FIG. 5, the operation panel 400 includes a liquid crystal touch panel 420, "Settings" key 401, "COPY" key 402, "DOCUMENT SERVER" key 403, "PRINT" key 404, "SEND" key 405, ten key 406, Clear and Stop (C/S) key 407, Start key 408, "SAVE" key 409, and "RESET" key 410.

Alternatively, one or more devices shown in FIG. 2 may not be provided. For example, the first mark detector 14 or the second mark detector 15 may not be provided.

The image forming devices 20Y, 20M, 20C, and 20K are arranged side by side along the transfer belt 2 to respectively form a yellow (Y) toner image, magenta (M) toner image, cyan (C) toner image, and black (K) toner image. Since the image forming devices 20Y, 20M, 20C, and 20K are substantially similar in structure and operation, the structure and operation of the image forming device 20Y are described below as an example.

The image forming device 20Y includes a photoconductor 6Y, a charger 7Y, a developer 9Y, a cleaning device 10Y, and a transfer device 12Y. The charger 7Y uniformly charges a surface of the photoconductor 6Y. An exposure device 8 exposes a light beam 11Y onto the charged surface of the photoconductor 6Y to form an electrostatic latent image of yellow color on the surface of the photoconductor 6Y. The developer 9Y develops the electrostatic latent image into a toner image. The transfer device 12Y transfers the toner image to a transfer position, which is a nip formed between the transfer belt 2 and the photoconductor 6Y. At the transfer position, the toner image is transferred from the surface of the photoconductor 6Y to a recording sheet 1 being carried by the transfer belt 2. The cleaning device 10Y removes a residual toner remained on the surface of the photoconductor 6Y after the toner image is transferred. The toner images of magenta, cyan, and black are respectively formed and transferred one above the other onto the recording sheet 1 in a substantially similar manner.

The transfer belt 2 is supported by the first and second transfer rollers 3 and 4, and is rotated in the direction indicated by the arrow of FIG. 2 by the transfer rollers 3 and 4. In this example, one of the transfer rollers 3 and 4 is a drive roller. The sheet tray 5, which stores a plurality of recording sheets, is provided below the transfer belt 2. One of the plurality of recording sheets, such as the recording sheet 1, is transferred toward the transfer belt 2, and carried by the transfer belt 2 to sequentially receive the toner images of yellow, magenta, cyan, and black.

The transfer sheet having the respective color images thereon, i.e., a full-color image, is further transferred to the fixing device 13. The fixing device 13 fixes the full-color image onto the recording sheet 1 with a heat and a pressure. The recording sheet 1 is then discharged from the image forming apparatus.

The optical wiring device 100 is capable of generating the light beams 11Y, 11M, 11C, and 11K according to image data. In one example, the image data is obtained by the image reader such as the scanner, and stored in an image memory. When forming an image, the optical writing device 100 reads out the image data from the image memory. The optical writing device 100 includes the exposure device 8, a filter 41, and a writing controller 42. The exposure device 8 irradiates the yellow light beam 11Y to the image forming device 20Y, the magenta light beam 11M to the image forming device 20M, the cyan light beam 11C to the image forming device 20C and the black light beam 11K to the image forming device 20K, as described below referring to FIG. 3. The exposure device 8 further outputs a synchronization detection signal for each color as described below referring to FIG. 4. The filter 41 applies filtering to the synchronization detection signal output by the exposure device 8. The writing controller 42 controls operation of the exposure device 8, for example, by outputting an image forming start signal.

Figure 3:
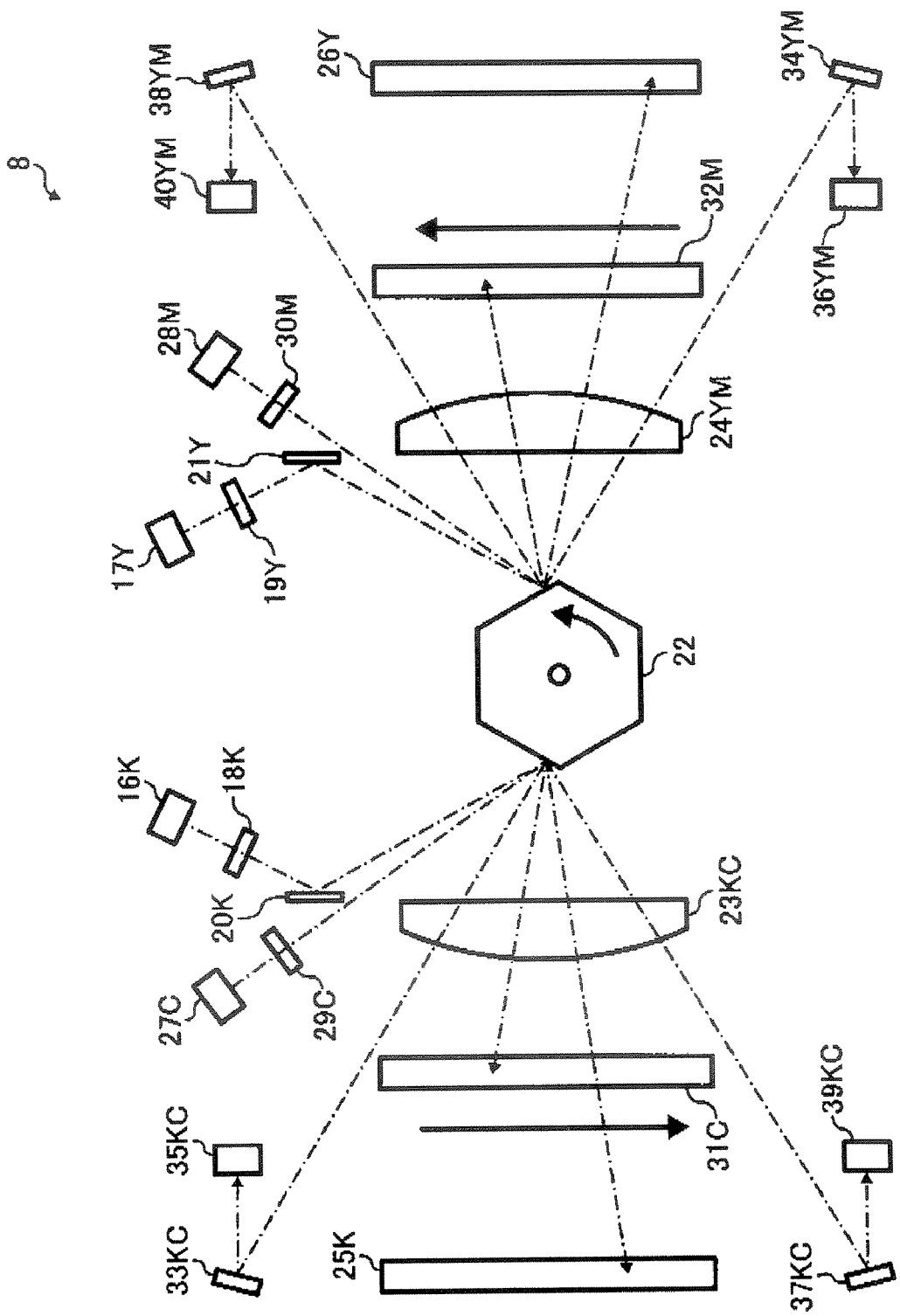
FIG. 3 is a schematic block diagram illustrating the structure of an exposure device according to an example embodiment of the present invention.

Referring to FIG. 3, the exposure device 8 includes a first laser diode (LD) 16K, a second LD 17Y, a third LD 27C, a fourth LD 28M, a first cylinder lens 18K, a second cylinder lens 19Y, a third cylinder lens 29C, a fourth cylinder lens 30M, a first reflective mirror 20K, a second reflective mirror 21Y, a polygon mirror 22, a first f-theta lens 23KC, a second f-theta lens 24YM, a first mirror 25K, a second mirror 26Y, a third mirror 31C, a fourth mirror 32M, a first cylinder mirror 33KC, a second cylinder mirror 34YM, a third cylinder mirror 37KC, a fourth cylinder mirror 38YM, a first sensor 35KC, a second sensor 36YM, a third sensor 39KC, and a fourth sensor 40YM.

In operation, the first LD 16K, which is driven by an LD driver of the writing controller 42, irradiates the light beam 11K toward an upper surface of the polygon mirror 22 through the first cylinder lens 18K and the first reflective mirror 20K. The polygon mirror 22 is rotatably driven by a mirror driver of the writing controller 42. With the rotation of the polygon mirror 22, the light beam 11K is scanned through the first f-theta lens 23KC and the first mirror 25K toward the photoconductor 6K (FIG. 2).

Similarly, the third LD 27C, which is driven by the LD driver, irradiates the light beam 11C toward a lower surface of the polygon mirror 22 through the third cylinder lens 29C. With the rotation of the polygon mirror 22, the light beam 11C is scanned through the first f-theta lens 23KC and the third mirror 31C toward the photoconductor 6C (FIG. 2).

Similarly, the second LD 17Y, which is driven by the LD driver, irradiates the light beam 11Y toward an upper surface of the polygon mirror 22 through the second cylinder lens 19Y and the second reflective mirror 21Y. With the rotation of the polygon mirror 22, the light beam 11Y is scanned through the second f-theta lens 24YM and the second mirror 26Y toward the photoconductor 6Y (FIG. 2).

Similarly, the fourth LD 28M, which is driven by the LD driver, irradiates the light beam 11M toward a lower surface of the polygon mirror 22 through the fourth cylinder lens 30M. With the rotation of the polygon mirror 22, the light beam 11M is scanned through the second f-theta lens 24YM and the fourth mirror 32M toward the photoconductor 6M (FIG. 2).

Further, in this example, the first sensor 35KC and the first cylinder mirror 33KC are provided at a first position, which is located outside of the image forming area of the black and cyan color images. The third sensor 39KC and the third cylinder mirror 37KC are provided at a third position, which is located outside of the image forming area of the black and cyan color images. As shown in FIG. 3, the light beams 11K and 11C are scanned in the direction from the first position to the third position.

In operation, the first sensor 35KC detects the light beams 11K and 11C deflected from the polygon mirror 22 through the first cylinder mirror 33KC to obtain first detection timing before the light beam 11K enters the image forming area and first detection timing before the light beam 11C enters the image forming area. The third sensor 39KC detects the light beams 11K and 11C deflected from the polygon mirror 22 through the third cylinder mirror 37KC to obtain second detection timing after the light beam 11K leaves the image forming area and second detecting timing after the light beam 11C leaves the image forming area. For example, a first synchronization detection signal output by the first sensor 35KC may be divided into a first synchronization detection signal for the black color and a first synchronization detection signal for the cyan color, in a substantially similar manner as described in the U.S. Pat. No. 6,587,137, patented on Jul. 1, 2003, the entire contents of which are hereby incorporated by reference. Similarly, a second synchronization detection signal output by the third sensor 39KC may be divided into a second synchronization detection signal for the black color and a second synchronization detection signal for the cyan color.

As described below referring to FIG. 4, in one example, timing for starting image formation of the cyan or black color may be controlled based on the first detection timing, or the first synchronization detection signal, obtained by the first sensor 35KC. Further, the timing for starting image formation of the cyan or black color may be controlled based on the difference time period between the first detection timing obtained by the first sensor 35KC and the second detection timing obtained by the third sensor 39KC, using the desired two-point detection method.

The second sensor 36YM and the second cylinder mirror 34YM are provided at a second position, which is located outside of the image forming area of the yellow and magenta color images. The fourth sensor 40YM and the fourth cylinder mirror 38YM are provided at a fourth position, which is located outside of the image forming area of the yellow and magenta color images. As shown in FIG. 3, the light beams 11Y and 11M are scanned in the direction from the second position to the fourth position.

In operation, the second sensor 36YM detects the light beams 11Y and 11M deflected from the polygon mirror 22 through the second cylinder mirror 34YM to obtain first detecting timing before the light beam 11Y enters the image forming area and second detecting timing before the light beam 11M starts scanning the image forming area. The fourth sensor 40YM detects the light beams 11Y and 11M deflected from the polygon mirror 22 through the fourth cylinder mirror 38YM to obtain second detection timing after the light beam 11Y leaves the image forming area and second detection timing after the light beam 11M leaves the image forming area. For example, a first synchronization detection signal output by the second sensor 36YM may be divided into a first synchronization detection signal for the yellow color and a first synchronization detection signal for the magenta color, in a substantially similar manner as described in the U.S. Pat. No. 6,587,137, patented on Jul. 1, 2003, the entire contents of which are hereby incorporated by reference. Similarly, a second synchronization detection signal output by the fourth sensor 40YM may be divided into a second synchronization detection signal for the yellow color and a second synchronization detection signal for the magenta color.

As described below referring to FIG. 4, in one example, timing for starting image formation of the yellow or magenta color may be controlled based on the first detection timing, or the first synchronization detection signal, obtained by the second sensor 36YM. Further, timing for starting image formation of the yellow or magenta color may be controlled based on the difference time period between the first detection timing obtained by the second sensor 36YM and the second detection timing obtained by the fourth sensor 40YM, using the desired two-point detection method.

Figure 4:
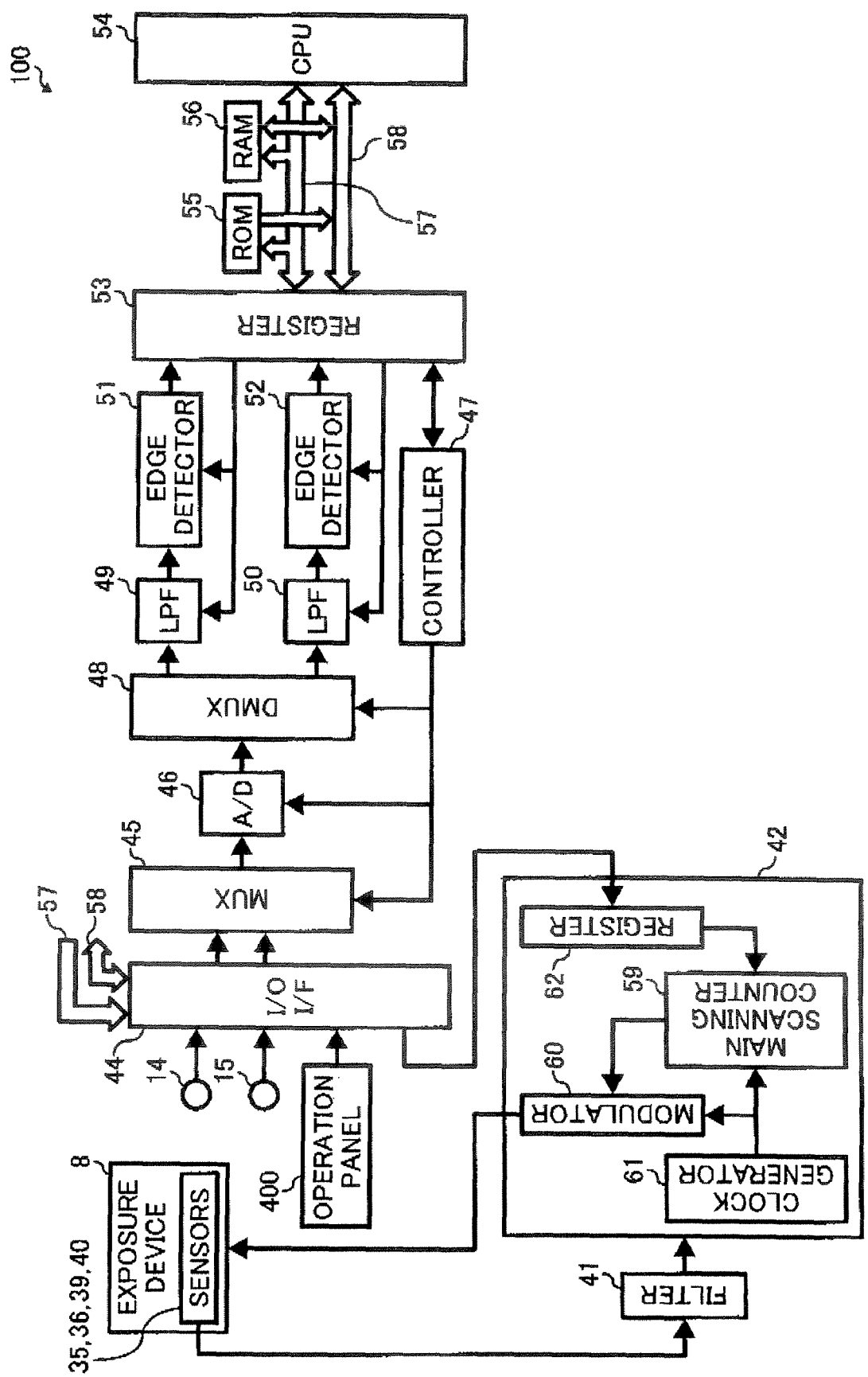
FIG. 4 is a schematic block diagram illustrating the structure of the optical writing device shown in FIG. 2 according to an example embodiment of the present invention.

Referring now to FIG. 4, an example structure of the optical writing device 100 shown in FIG. 2 is explained in more detail. The optical writing device 100 includes the exposure device 8 (FIG. 3), the filter 41 (FIG. 2), the writing controller 42 (FIG. 2), an input/output interface (I/O IF) 44, a multiplexer (MUX) 45, an analog/digital converter (A/D) 46, a demultiplexer (DMUX) 48, a first low pass filter (LPF) circuit 49, a second LPF circuit 50, a controller 47, a first edge detector 51, a second edge detector 52, a register 53, a central processing unit (CPU) 54, a read only memory (ROM) 55, and a random access memory (RAM) 56. Further, the optical writing device 100 is electrically connected to the first mark detector 14 (FIG. 2), the second mark detector 15 (FIG. 2), and the operation panel 400 (FIG. 5), through the I/O I/F 44. The optical writing device 100 may be connected to other devices in the image forming apparatus of FIG. 2.

In addition to the LD driver and the mirror driver described above referring to FIG. 3, the writing controller 42 may include a modulator 60, a clock generator 61, a main scanning counter 59, and a register 62. The clock generator 61 generates a reference clock signal. The main scanning counter 59 counts a time period in the main scanning direction in synchronization with the reference clock signal to generate a counter value. The modulator 60 modulates a light beam according to image data. The register 62 may store a plurality of reference counter values, which may be used by the optical writing device 100 as described below. The register 62 may additionally store a reference time period, which may be used by the optical writing device 100 for correcting the color registration error.

In this example, the writing controller 42 outputs an image forming start signal, which causes the LD 16K, 17Y, 27C, and 28M to respectively start image formation of the black color, yellow color, cyan color, and magenta color. The timing for outputting the image forming start signal for the black or cyan color is determined based on at least one of the synchronization detection signals output by the sensors 35KC and 37KC. The timing for outputting the image forming start signal for the yellow or magenta color is determined based on at least one of the synchronization detection signals output by the sensors 36YM and 40YM.

Figures 6, 7:
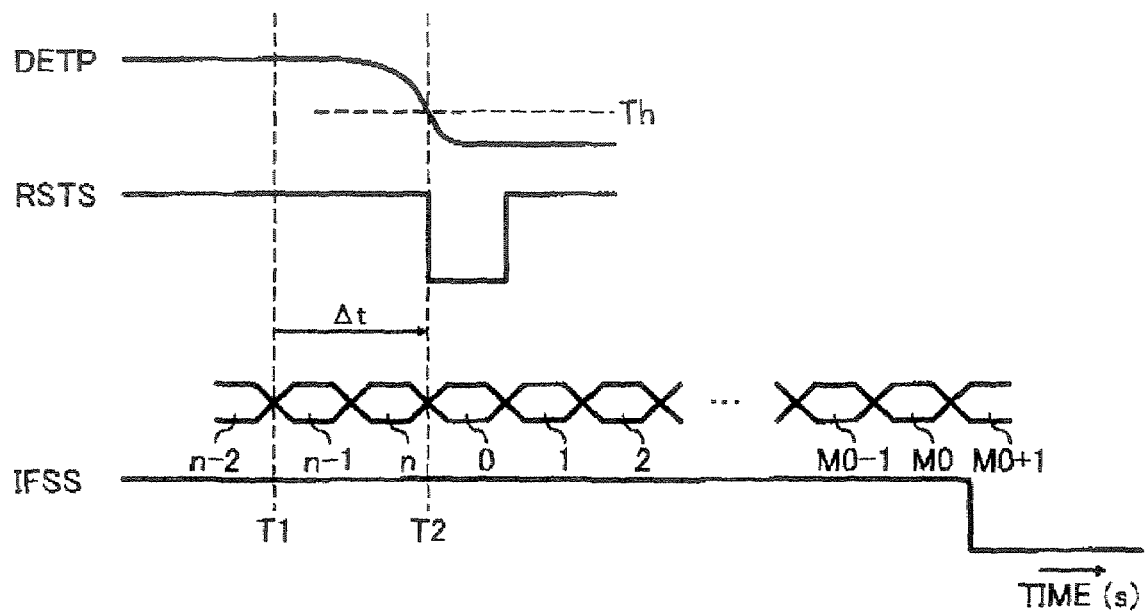
FIG. 6 is a timing chart illustrating an operation of controlling timing for starting image formation according to an example embodiment of the present invention.
FIG. 7 is a table illustrating the relationship between various image forming parameters and an operation mode according to an example embodiment of the present invention.

As an example, operation of determining an image forming start signal for the yellow color is explained referring to FIGS. 4 and 6. The second sensor 36YM, which may be implemented by a light receiving element such as a photodiode, detects the light beam 11Y when the light beam 11Y enters the second sensor 36YM at timing T1 (FIG. 6). However, due to the electric characteristics of the second sensor 36YM and/or the filter 41 coupled to the second sensor 36YM, the second sensor 36YM may output a first synchronization detection signal DETP (FIG. 6) having the sine waveform. In this example, the filter 41 is provided between the second sensor 36YM and the writing controller 42 to pass a low frequency component of the DETP signal as illustrated in FIG. 6.

The writing controller 42 may detect the DETP signal at timing T2 (FIG. 6) after the timing T1 when the level of the DETP signal reaches below a threshold Th. For example, the writing controller 42 outputs a high level signal when the level of the DETP signal is equal to or greater than the threshold Th. The writing controller 42 outputs a low level signal when the level of the DETP signal is less than the threshold Th. When the low level signal is output, the writing controller 42 outputs a reset signal RSTS (FIG. 6).

When the reset signal RSTS is output, the main scanning counter 59 resets the counter value to 0 (FIG. 6), and starts counting a time period in the main scanning direction in synchronization with the reference clock signal generated by the clock generator 61.

When the counter value of the main scanning counter 59 reaches a reference counter value M0, the writing controller 42 activates an image forming start signal IFSS (FIG. 6) by changing the level of the image forming start signal IFSS from high to low. When the image forming start signal IFSS is activated, the exposure device 8 starts image formation of the yellow color in the image forming area.

In this example, the reference counter value M0 may be previously read out from the register 62. For example, the plurality of reference counter values stored in the register 62 may correspond to a plurality of operation modes of the image forming apparatus of FIG. 2. The writing controller 42 may select the reference counter value from the plurality of reference counter values according to an operation mode in which the image forming apparatus of FIG. 2 is currently operating. Alternatively, the writing controller 42 may select the reference counter value, which corresponds to the default operation mode of the image forming apparatus of FIG. 2. Alternatively, the writing controller 42 may select the reference counter value according to an instruction received through the I/O I/F 44, for example, from the operation panel 400 or the CPU 54.

Since the timing for starting image formation is counted from the timing T2, the timing for starting image formation is not negatively affected by the delay time period Δt, which is the difference between the timing T1 and the timing T2. Accordingly, the detection accuracy of the second sensor 36YM may increase.

The detection accuracy of any one of the other sensors 35KC, 39KC, and 40YM may increase in a substantially similar manner.

In one example, the detection accuracy of the sensor, which outputs the first synchronization detection signal, may be increased. For example, the first sensor 35KC and the second sensor 36YM may be selected. Accordingly, timing for starting image formation may be controlled based on the first synchronization detection signal.

In another example, the detection accuracy of each sensor may be increased. With the increased detection accuracy of each sensor, the registration in the main scanning direction or the magnification error may be corrected with higher accuracy, for example, using the two-point detection method. The writing controller 42 obtains a difference time period between the timing when the first synchronization detection signal is detected and the timing when the second synchronization detection signal is detected. The writing controller 42 compares the obtained difference time period with a reference difference time period, which may be obtained from the register 62. Based on the comparison result, the writing controller 42 may control a writing clock signal using the modulator 60.

However, in order to facilitate the color registration process, the delay time period Δt, which is the difference between the timing T1 and the timing T2, may be set substantially equal for all four colors. For example, one or more parameters related to the delay time period Δt, such as the characteristics of each sensor, the characteristics of a filter coupled to each sensor, or the value of a threshold Th, may be set equal for all four colors.

In addition or in alternative to using the single point or two-point detection method, the registration in the main scanning direction, the registration in the sub-scanning direction, the magnification error, or the skew, may be corrected with higher accuracy, using the detection result output by the first mark detector 14 and/or the second mark detector 15. In operation, the mark detectors 14 and 15 each detect a pattern formed on the surface of the transfer belt 2, for example, by receiving light beams deflected from the surface of the transfer belt 2. Upon detection, the mark detectors 14 and 15 input the voltages of the light beams to the MUX 45 through the I/O IF 44. The MUX 45 outputs one of the detected voltages through a sensor channel, which is selected by the controller 47, as a data signal. The A/D converter 46 converts the data signal from analog to digital, and outputs the digital data signal to the DMUX 48. The DMUX 48 outputs the digital data signal to a selected one of the LPF circuits 49 and 50. The selected one of the LPF circuit 49 and 50 attenuates a high frequency component of the digital data signal according to a cut frequency, and passes a low frequency component to the corresponding one of the edge detectors 51 and 52. The selected one of the edge detectors 51 and 52 compares the data signal with a threshold Th1, and obtains the detected position of the pattern based on the comparison result. The detected position may be stored in the register 53. From the detected position, the CPU 54 may further calculate the amount of registration in the main scanning direction, the amount of registration in the sub scanning direction, the amount of skew, and/or the magnification error, for example, as described in the U.S. Patent Application Publication No. 2004/041896, published on Mar. 4, 2004, the entire contents of which are hereby incorporated by reference. Any one of the values obtained by the CPU 54 may be sent to the writing controller 42 through the I/O I/F 44 via an address bus 57 and a data bus 58. Using the obtained values, the writing controller 42 may adjust operation of the exposure device 8.

Further, in this example, the timing for starting image formation may be adjusted depending on various image forming conditions to compensate the fluctuations in the first image formation position.

In one example, various image forming conditions may be organized into a plurality set of image forming parameters as illustrated in FIG. 7. The plurality set of image forming parameters may be stored in the form of table in the ROM 55 (FIG. 4). The image forming parameters may include, for example, the resolution of an image expressed in dots per inch (dpi), the process speed of the image forming apparatus expressed in mm/s, the rotational speed of the polygon mirror 22 expressed in the revolution per minute (rpm), the frequency of the clock signal used for image formation expressed in MHz, etc. As shown in FIG. 5, each set of image forming parameters shown in FIG. 7 corresponds to one of the operation modes operable by the image forming apparatus shown in FIG. 2, including, for example, the high-speed mode, heavy-paper mode, and high-quality mode.

As shown in FIG. 5, a user may select one of the operation modes by touching the liquid crystal touch panel 420. Further, in this example, the reference counter value M, which determines the timing for starting image formation, is stored in a corresponding manner with the set of image forming parameters. By referring to the table shown in FIG. 7, the CPU 54 may instruct the writing controller 42 to adjust the timing for starting image formation according to the operation mode through the I/O I/F 44.

When the high-speed mode is selected, the image forming apparatus of FIG. 2 operates with the image resolution of 600 dpi by 600 dpi, the process speed of V0 mm/s, the mirror speed of N0 rpm, and the clock frequency of f0 MHz. With this set of image forming parameters, the reference counter value M is set to M0.

When the heavy-paper mode is selected, the image forming apparatus shown in FIG. 2 operates with the image resolution of 600 dpi by 600 dpi, the process speed of V0/2 mm/s, the mirror speed of N0/2, and the clock frequency of f0/2 MHz. With this set of image forming parameters, the reference counter value M is set to M1. Since the clock frequency of the heavy-paper mode is half the clock frequency f0 of the high-speed mode, the image forming start position of the heavy-paper mode is shifted toward one end of the image forming area relative to the image forming start position of the high-speed mode. Accordingly, the reference counter value M1 should be greater than the reference counter value M0 by a predetermined number of image pixels.

The number of image pixels may be determined based on the difference in a number of clocks counted during the delay time period Δt. For example, referring to FIG. 6, when the high-speed mode is selected, two clocks are counted during the delay time period Δt. When the heavy-paper mode is selected, the number of clocks is reduced from two to one as the clock frequency of the heavy-paper mode is reduced by half. Accordingly, the image forming start position is shifted by one image pixel toward one end of the image forming area. To compensate this, the reference counter value M1 needs to be greater than the reference counter value M0 by one: M1=M0+1.

When the high-quality mode is selected, the image forming apparatus shown in FIG. 2 operates with the image resolution of 1200 dpi by 1200 dpi, the process speed of V0/4 mm/s, the mirror speed of N0/2, and the clock frequency of f0. With this set of image forming parameters, the reference counter value M is set to M2. Since the resolution of the high-quality mode is twice the resolution of the high-speed mode, the size of the image pixel of the high-quality mode becomes half the size of the image pixel of the high-speed mode. For this reason, the reference counter value of the high-quality mode becomes twice the reference counter value of the high-speed mode.

Further, the image forming start position of the high-quality mode may be shifted relative to the image forming start position of the high-speed mode by a predetermined number of image pixels.

The number of image pixels may be determined based on the difference in the size of image pixels formed during the delay time period Δt. For example, referring to FIG. 6, when the high-speed mode is selected, two clocks are counted during the delay time period Δt. When the high-quality mode is selected, two clocks are counted during the delay time period Δt. However, since the pixel size of the high-quality mode is half the pixel size of the high-speed mode, the image forming start position is shifted by two 1200 dpi image pixels (or one 600 dpi image pixel) toward one end of the image forming area. To compensate this, the reference counter value M2 needs to be greater than the twice of the counter value M0 by two: M2=M0*2+2.

Figure 8:
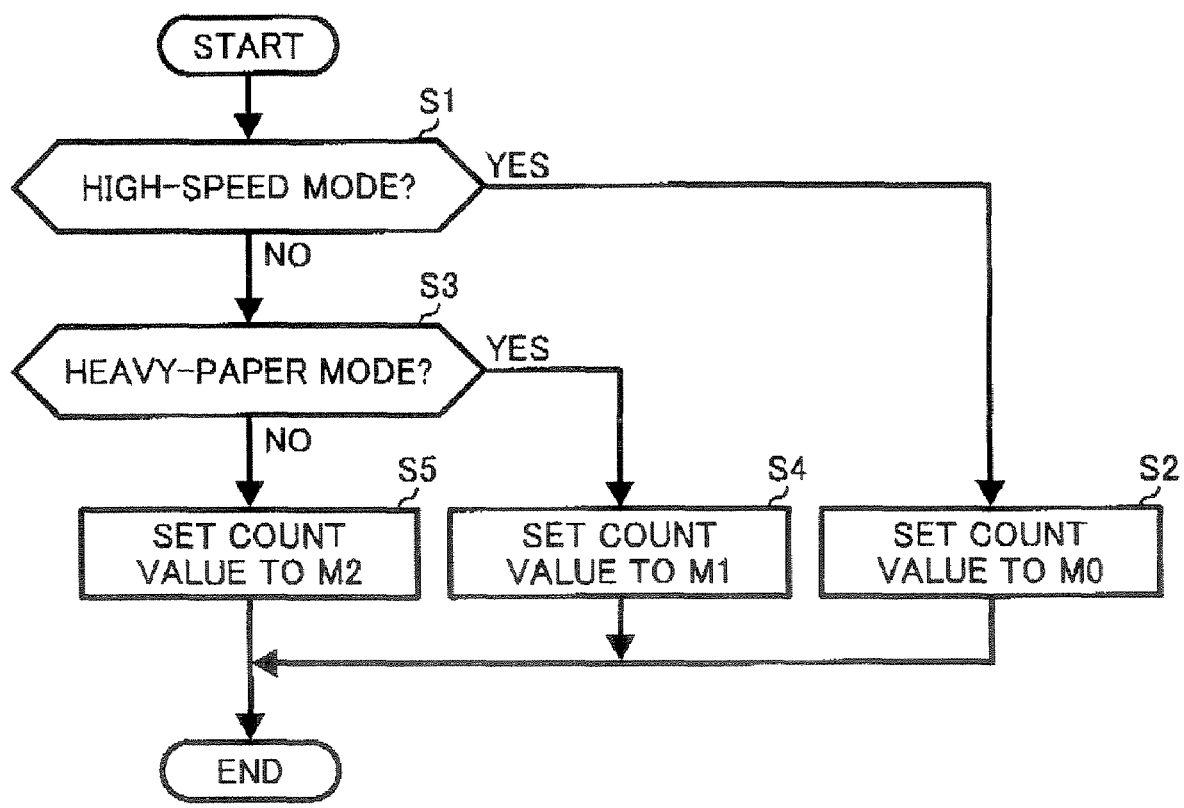
FIG. 8 is a flowchart illustrating an operation of controlling timing for starting image formation according to an operation mode, according to an example embodiment of the present invention.

Referring now to FIG. 8, operation of controlling a reference counter value M according to an operation mode is explained according to an example embodiment of the present invention. The operation shown in FIG. 8 is performed by the CPU 54. For example, when a user selects one of the operation modes displayed by the operation panel 400 of FIG. 5, the CPU 54 loads a computer program stored in the ROM onto the RAM.

In this example, the image forming apparatus shown in FIG. 2 is designed to operate in the high-speed mode by default. As illustrated in FIG. 5, the "HIGH-SPEED MODE" key 431 is initially selected by default. However, the user may select the "SETTINGS" key 401 to change the default operation mode.

At S1, the CPU 54 determines whether the high-speed mode has been selected.

When the high-speed mode has been selected ("YES" at S1), the operation proceeds to S2. Otherwise ("NO" at S1), the operation proceeds to S3.

At S3, the CPU 54 determines whether the heavy-paper mode has been selected. The heavy-paper mode may be selected by pressing the "HEAVY-PAPER MODE" key 432. When the heavy-paper mode has been selected ("YES" at S3), the operation proceeds to S4. Otherwise ("NO" at S3), the operation proceeds to S5.

At S2, the CPU 54 sets the reference counter value M to M0, and the operation ends. In one example, the CPU 54 may obtain the set of image forming parameters from the ROM 55, and instruct the exposure device 8 to operate according to the image forming parameters. However, since the reference counter value M0 is set by default, S2 may not be performed when the mode is not changed.

At S4, the CPU 54 sets the reference counter value M to M1, and the operation ends. In one example, the CPU 54 may obtain the set of image forming parameters from the ROM 55, and instruct the writing controller 42 to operate according to the obtained set of image forming parameters. In another example, the CPU 54 may calculate the reference counter value M1 from the default reference counter value M0, using the equation: M1=M0+1.

At S5, the CPU 54 sets the reference counter value M to M2, and the operation ends. In one example, the CPU 54 may obtain the set of image forming parameters from the ROM 55, and instruct the writing controller 42 to operate according to the obtained set of image forming parameters. In another example, the CPU 54 may calculate the reference counter value M2 from the default reference counter value M0, using the equation: M2=M0*2+2.

The operation shown in FIG. 8 may be performed in various other ways. For example, the steps illustrated in FIG. 8 may be performed in different order. Further, the operation shown in FIG. 8 is preferably performed after completing the operation of correcting the color registration or magnification described above referring to FIG. 4. In this manner, the operation of correcting can be performed in the high-speed mode, thus increasing the process speed of the image forming apparatus of FIG. 2. Since timing for starting image formation can be set for two other operation modes based on the default operation mode, the operation of correcting the color registration is not necessary for the other two operation modes.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

In another example, the optical writing device described above may be incorporated in any kind of image forming apparatus, for example, an image forming apparatus having a revolver-type image forming device, an image forming apparatus having an intermediate transfer device, etc.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc. Further, the register or the memory described above in this specification may be replaced by any desired storage device or medium.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An optical writing device, comprising:
   an exposure device configured to irradiate a light beam and scan the light beam in a main scanning direction to form an image in an image forming area, the exposure device comprising:
      a first detector provided outside of the image forming area and configured to output a first synchronization detection signal when the light beam enters the first detector; and
      a writing controller configured to output an image forming start signal for instructing the exposure device to start image formation in the image forming area by modulating the light beam, the writing controller comprising:
         a counter configured to count a time period in the main scanning direction in synchronization with a reference clock signal to generate a counter value, initialize the counter value when the first synchronization detection signal is detected by the writing controller, and cause the writing controller to output the image forming start signal when the counter value becomes equal to or greater than a reference counter value; and
         a storage device configured to store a plurality of reference counter values in a corresponding manner with a plurality of operation modes of the optical writing device, wherein the reference counter value is selected from the plurality of reference counter values,
   wherein the timing for the image forming start signal is based on a difference in an image forming start position between a default operation mode and a second operation mode.

2. The device of claim 1, wherein the reference counter value is a default reference counter value obtained when the optical writing device operates in the default operation mode.

3. The device of claim 1, wherein the exposure device further comprises:
   a second detector provided outside of the image forming area and configured to output a second synchronization detection signal when the light beam enters the second detector,
   wherein the counter of the writing controller is configured to further count a difference time period between timing when the first synchronization detection signal is detected by the writing controller and timing when the second synchronization detection signal is detected by the writing controller and compare the difference time period with a reference difference time period to generate a comparison result.

4. The device of claim 3, wherein characteristics of the first detector and characteristics of the second detector are substantially equal.

5. The device of claim 3, wherein the writing controller is further configured to correct a registration or magnification error generated by the exposure device based on the comparison result.

6. The device of claim 1, wherein the writing controller comprising:
   an adjustment device configured to adjust an image forming start signal based on image forming conditions.

7. An image forming apparatus, comprising:
   an optical writing device configured to form an image in an image forming area by irradiating a light beam toward the image forming area, the optical writing device comprising:
      a first detector provided outside of the image forming area and configured to output a first synchronization detection signal when the light beam enters the first detector;
      a writing controller configured to obtain a counter value counted from timing when the writing controller detects the first synchronization detection signal and output an image forming start signal when the counter value becomes equal to or greater than a reference counter value; and
      a storage device configured to store a plurality of reference counter values in a corresponding manner with a plurality of operation modes of the image forming apparatus,
   wherein the timing for the image forming start signal is based on a difference in an image forming start position between a default operation mode and a second operation mode.

8. The apparatus of claim 7, further comprising:
   an operation panel configured to select an operation mode from the plurality of operation modes stored in the storage,
   wherein the reference counter value is determined according to the selected operation mode.

9. The apparatus of claim 7, wherein the storage further stores:
a plurality set of image forming parameters in a corresponding manner with the plurality of operation modes.

10. The apparatus of claim 7, wherein the image forming start signal is adjusted based on image forming conditions.

11. A method for controlling timing for starting image formation, the method comprising:
providing an optical writing device, which forms an image in an image forming area by scanning a light beam in a main scanning direction toward the image forming area;
detecting a first synchronization detection signal, which is output from the optical writing device at timing before the light beam enters the image forming area;
counting a time period in the main scanning direction from timing when the detecting detects the first synchronization detection signal to generate a counter value;
outputting an image forming start signal for instructing the optical writing device to form the image in the image forming area, when the counter value becomes equal to or greater than a reference counter value;
selecting a first reference counter value from a plurality of reference counter values according to an operation mode of the optical writing device; and
controlling the timing of the image forming start signal based on a difference in an image forming start position between a default operation mode and a second operation mode,
wherein the reference counter value is set to the first reference counter value.

12. The method of claim 11, wherein the reference counter value is initially set to a default reference counter value obtained when the optical writing device operates in the default operation mode.

13. The method of claim 12, wherein the default operation mode is a high-speed operation mode.

14. The method of claim 12, further comprising:
detecting a second synchronization detection signal, which is output from the optical writing device at timing after the light beam leaves the image forming area;
obtaining a difference time period between the timing when the detecting detects the first synchronization detection signal and timing when the detecting detects the end synchronization detection signal;
comparing the difference time period with a reference difference time period to generate a comparison result; and
applying a correcting operation to the optical writing device based on the comparison result.

15. The method of claim 14, further comprising:
determining whether the default operation mode of the optical writing device is changed to the second operation mode; and
obtaining a second reference counter value corresponding to the second operation mode based on the default reference counter value, when the determining determines that the default operation mode is changed,
wherein the reference counter value is changed to the second reference counter value from the default reference counter value.

16. The method of claim 15, wherein the obtaining comprises:
determining a difference in an image forming start position between the second operation mode and the default operation mode to generate a determination result,
wherein a difference between the second reference counter value and the default reference counter value compensates the difference in the image forming start position between the second operation mode and the default operation mode.

17. The method of claim 11, further comprising:
adjusting the image forming start signal based on image forming conditions.

* * * * *